United States Patent [19]

Garland

[11] Patent Number: 5,327,488
[45] Date of Patent: Jul. 5, 1994

[54] REMOTELY INITIATED TELEMETRY CALLING SYSTEM

[75] Inventor: Stuart M. Garland, Morton Grove, Ill.

[73] Assignee: AT&T Bell Laboratories, Murray Hill, N.J.

[21] Appl. No.: 855,997

[22] Filed: Mar. 20, 1992

[51] Int. Cl.$^5$ ............. H04M 3/42; H04M 11/00/3/00
[52] U.S. Cl. ................. 379/201; 379/106; 379/244; 379/246; 379/215
[58] Field of Search ............. 379/40, 51, 142, 201, 379/243, 244, 245, 246, 106, 107, 215

[56] References Cited

U.S. PATENT DOCUMENTS

| | | | |
|---|---|---|---|
| Re. 29,499 | 12/1977 | Spencer | 379/8 |
| 3,868,640 | 2/1975 | Binnie et al. | 340/151 |
| 3,899,639 | 8/1975 | Clevely et al. | 379/107 |
| 3,922,492 | 11/1975 | Lumsden | 379/107 |
| 4,008,458 | 2/1977 | Wensley | 340/151 |
| 4,046,340 | 2/1987 | Hargrave et al. | 379/106 |
| 4,691,344 | 9/1987 | Brown et al. | 379/106 |
| 4,804,957 | 2/1989 | Selph et al. | 340/870.03 |
| 4,850,010 | 7/1989 | Stanbury et al. | 379/107 |
| 4,856,047 | 8/1989 | Saunders | 379/57 |
| 4,965,459 | 10/1990 | Murray | 379/200 X |
| 5,189,694 | 2/1993 | Garland | 379/107 X |

FOREIGN PATENT DOCUMENTS

| | | | |
|---|---|---|---|
| B65948/86 | 4/1986 | Australia | 379/107 |
| 0313453 | 10/1988 | European Pat. Off. | 379/106 |
| 0339697 | 3/1989 | European Pat. Off. | 379/106 |
| 0343089 | 5/1989 | European Pat. Off. | 379/106 |
| 4-091546 | 3/1992 | Japan | 379/215 |
| WO8607222 | 4/1986 | PCT Int'l Appl. | 379/106 |
| WO8908959 | 9/1989 | PCT Int'l Appl. | 379/106 |
| 2099260 | 12/1982 | United Kingdom | 379/107 |
| 2166625 | 5/1986 | United Kingdom | H04M 11/06 |

OTHER PUBLICATIONS

F. Hargrave et al., "Residential Data Services", Electrical Communication, vol. 60, No. 1, 1986, pp. 33-39.
"Introduction to Off-Talk Communication Services", Steve Nakanishi, FTEL, Paris, Nov. 13-14, 1989.
Ameritech Technical Reference, AM TR-MK-T-000035, Ameritech Standard, Issue 1, Mar. 1989, "Automatic Meter Reading Services Interface Specifications".
K. Kanai et al., "Automatic Remote Meter Reading System", Japan Telecommunications Review, Oct. 1979, pp. 378-384.
C. Cohen, "Computer Reads On-location Meters By Using No-Ring Phone Circuits On Existing Lines", Electronic, Jan. 27, 1983, pp. 71, 72.
K. Shirai et al., "Remote Automatic Meter Reading and Telecontrol System Using Telephone Lines", NEC Research and Development, No. 65, Apr. 1982, pp. 82-92.
M. Kurachi et al., "New Telecommunications Service for Telemetering", International Conference On Computer Communication, Nov. 1984, pp. 219-223.
F. Kruger, "TEMEX erschliesst neue Markte", Net-Nachrichten Elektronik Und Telematik, vol. 42, No. 5, May 1988, pp. 212-216, (copy of translation attached).
M. Suzuki, "Automatic Meter Reading At Tokyo Gas", Proceedings, Automatic Meter Reading Association, 4th Annual Symposium, Boston, Sep. 22-27, 1991, pp. 97-104.
"TELEACTION-Stage 1 Service Description", Draft, European Telecommunication Standard, Feb. 1992, pp. 1-22.
"Bell Atlantic IQ Services", C & P White Pages, Jan. 1991, p. 11.

Primary Examiner—James L. Dwyer
Assistant Examiner—Harry S. Hong
Attorney, Agent, or Firm—Werner Ulrich

[57] ABSTRACT

This invention relates to a method and apparatus for accessing a service bureau or utility via a telemetry call from automated customer premises equipment, such as device state reporting or alarm equipment, without permitting features assigned to the associated customer to interfere with that call. Customer features such as call waiting are canceled for the duration of the telemetry call and are reactivated after the call has been terminated. Advantageously, access from the customer premises equipment to a service bureau or utility may be provided over a telephone line without limiting the customer's choice of telephone features.

29 Claims, 3 Drawing Sheets

REMOTELY INITIATED TELEMETRY CALLING SYSTEM

TECHNICAL FIELD

This invention relates to telemetry systems using telecommunications networks, and more specifically, to arrangements for initiating telemetry communications from remote locations of such systems.

PROBLEM

Currently there are many applications wherein customer premises equipment of an end user of telemetry service initiates a remote telemetry telecommunications call to some centralized service bureau. Such arrangements are used, for example, to transmit a meter reading, report energy and appliance usage, report alarm or maintenance conditions or to forward burglar alarm signals or fire alarm signals from homes to service bureaus or directly to police or fire stations. In such systems when an alarm indication is detected, a call is automatically set up to the service bureau and some identification of the caller is transmitted over the connection to the service bureau. The service bureau then responds by dispatching police or fire equipment to the residence from which the alarm signal was received. Telemetry calls may also be initiated remotely for cases wherein the measuring system initiates a data report or a trouble report. For the purposes of this description, calls initiated by customer premises equipment are considered inbound (i.e., inbound to a switch or service bureau) while calls initiated from the service bureau or switch are considered outbound.

A problem with such arrangements is that a data stream being transmitted from the caller to the service bureau may be interrupted by such signals as a call waiting signal generated in a switching system if the residential customer from which the alarm signal is being transmitted has the call waiting feature and another customer happens to call during the telemetry call. Further, the use of such equipment limits the customer's ability to subscribe to telephone call screening features such as features which allow a customer to be denied toll service to a particular area if the service bureau happens to be located in this other toll area. A problem of the prior art therefore is that there is significant interference between a broad class of modern telecommunications services and remotely initiated telemetry reporting services or alarm services.

SOLUTION

The above problem is solved and an advance is made over the prior art in accordance with applicant's invention wherein a special service call, such as a telemetry call, is identified by an access code and wherein reception of that access code causes the switching system to deactivate special features of the caller, for example, to deny incoming call waiting for the duration of the special service call and to deactivate outgoing call screening. In one specific embodiment, the switching system further checks to ensure that calls placed following the access code are limited to calls to prespecified telephone numbers. Following the disconnect of the special service call, the customer's services special features, including, where appropriate, call waiting, are reactivated. Advantageously, such an arrangement breaks any link between customer features and the characteristics of a remote telemetry call to a service bureau or utility and does so at low cost by providing only a simple set of programmed checks, feature deactivation, and feature reactivation in a telecommunications switching system connected to the remote telemetry caller line.

In accordance with one aspect of a preferred embodiment of the invention, the call is billed to the called customer. Advantageously, most customers prefer this arrangement since they consider the telemetry call a part of the utility or alarm monitoring service and may not want to pay for services they do not directly use. This arrangement also permits calls to be originated from lines that have been denied most types of originating service, for example, from vacant homes.

In accordance with a preferred embodiment of the invention, a standard meter interface unit used for telemetry reading of meters and controlling of devices is enhanced to provide inbound call control features. This unit disconnects the telephone when the inbound call is one of an emergency nature from a device such as an alarm or a medical monitor because of the high priority of the emergency signals. Advantageously, the incremental cost for providing remotely initiated telemetry calls is minimized.

In accordance with one specific embodiment of the invention, if the telephone instrument on the line used for telephone and telemetry purposes is an integrated services digital network (ISDN) type of telephone, a special indicator in the initial call set up message performs the same function as is performed by the access code for a conventional analog signal line. The D-channel is used to communicate between the connected switching system and the customer telemetry equipment. With this type of arrangement, it is not necessary to disconnect the end user's telephone equipment during the telemetry call.

DETAILED DESCRIPTION

Figure 1:
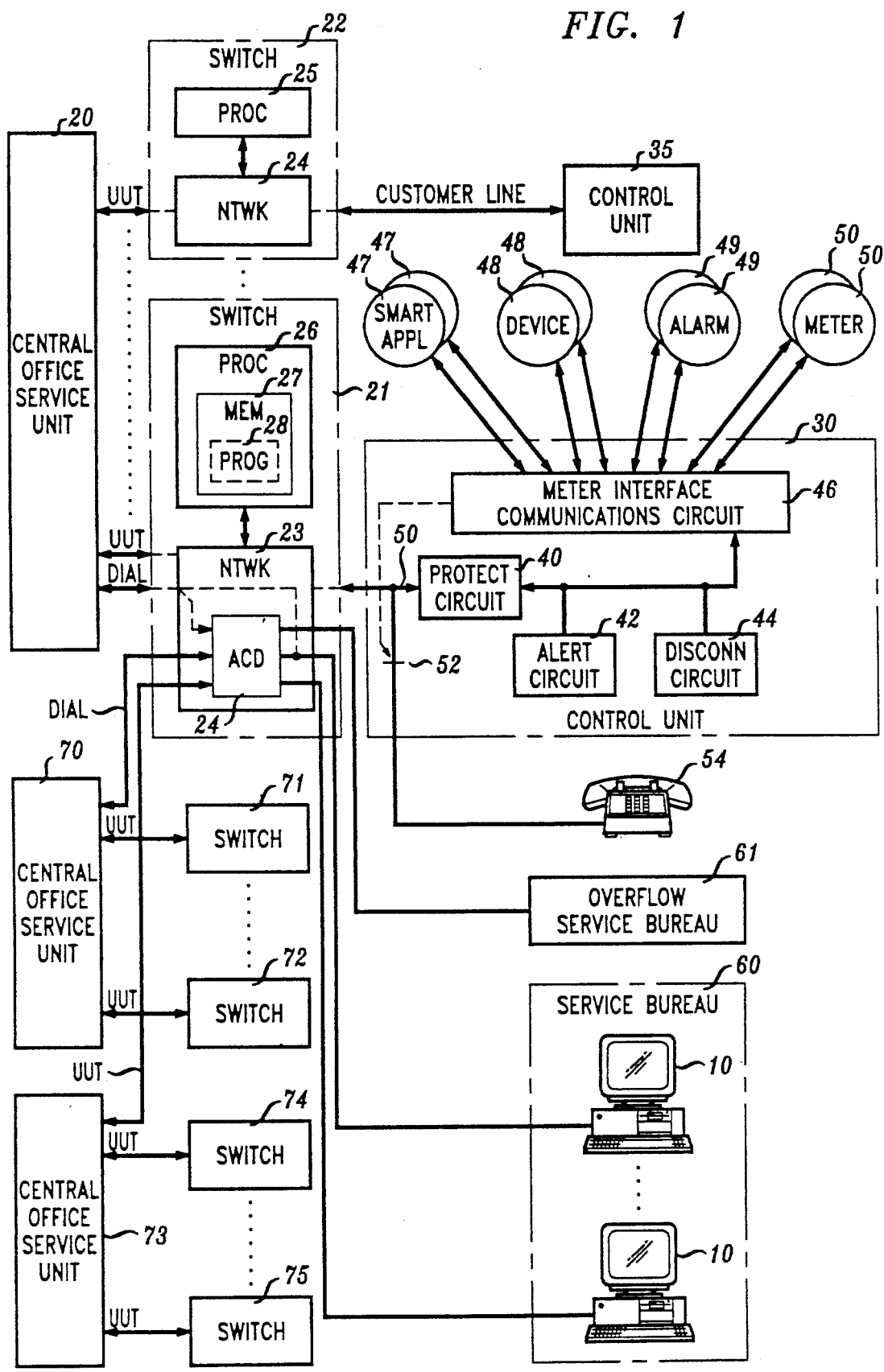
FIG. 1 is a block diagram illustrating connections for transmitting data from customer meters and devices.

The described analog Inbound Utility Telemetry Service (Telemetry Interface Unit to Utility) builds on an Outbound Utility Telemetry Service (Utility to Telemetry Interface Unit). One Central Office Service Unit (COSU) can serve multiple offices with standard analog or digital E & M interoffice trunk groups. The COSU is connected to the Utility or third party provider by a dial up line, private line, or packet network.

The following Inbound Utility Telemetry Service is described in terms of a meter reading service. The network architecture and switch features also support other applications such as fire alarms, security alarms, and appliance initiated service requests.

With today's prior art inbound techniques, the Meter Interface Communications Circuit (MICC) (FIG. 1, block 46) dials directly through the central office switch 21 to a service bureau of the utility or third party service provider. There is no control of the features associated with the calling line. Call features such as Call Waiting may disrupt the data stream causing errors or completely abort the call. Call screening lists may prohibit the MICC from placing the call. This disruption causes additional time consuming retransmission, reinitiated inbound telemetry calls, and an inability to place calls. If the telemetry call is allowed to proceed, the MICC may or may not invoke switch features available to end users. For example, the MICC could activate Cancel Call Waiting. The MICC could not, however, suspend other end user line features since the end user has no direct suspension control over these features.

In accordance with applicant's invention, Inbound Telemetry Service routes the call from the end user's line to a central office service unit 20 which will then communicate with a utility controller or position in a service bureau 60. The switch identifies the telemetry call based on an access code and a second dial tone is presented for the destination directory number. The switch then deactivates the end user's line features disruptive to telemetry calls and reactivates the end user line features at the completion of the call. When the call is completed, an Automatic Message Accounting (AMA) record can be produced charging the utility for the call (reverse charging). Since these calls have reverse charging, inbound telemetry calls could be allowed from lines that are unassigned for billing purposes (vacant houses etc.).

Calls to the utility, from the central office service unit, can be delivered by a circuit switched network, packet network, or can be further directed by switch based Multiline Hunt Groups or by an Automatic Call Distributor (ACD).

The MICC goes off-hook and dials an access code. The switch recognizes the access code and gives a second dial tone. The switch activates/deactivates end user line features disruptive to the telemetry call. The MICC dials a local restricted group of telephone numbers which terminates through a utility telemetry trunk (UTT) to the central office service unit (COSU). The central office service unit and MICC perform a security exchange. The MICC instructs the COSU, via a telemetry protocol, which utility or third party service provider (referred to hereinafter, as utility) is to receive the MICC information. If desired, the utility or service provider may have an additional security dialog with the MICC. If the security exchange is not accepted, the call is dropped by the COSU. Otherwise, the COSU transmits the received MICC information to the specified utility or service provider. A two-way data exchange may take place between the utility and the MICC. The MICC will not make a telemetry call if the end user's line is busy. The MICC interrupts the telemetry call if an end user goes off-hook. The utility or COSU terminates the call by going on-hook.

An AMA record is produced charging the utility or service provider for the call (reverse charging) from the end user.

Access code calls are allowed, through translations, when the end user line is unassigned for billing purposes. For example, if the end user line has a class of service such as the Fast New Service Installation service offered by BellSouth, the end user line can originate a limited class of calls (such as calls requesting service, made when a telephone customer moves into a previously vacant house having installed telephones or telephone jacks); the access code can be one of the limited class of calls which can be made by a line having that type of service.

The MICC has requirements of being able to go off-hook, dial a string of digits, and initiating a dialog with the COSU. These requirements are:

The telemetry call to the COSU is initiated by the MICC going off-hook. An access code precedes the directory number of the COSU destination. The first dial tone is the indicator to dial the access code. A second dial tone is an indicator to dial the directory number, required if the numbering plan of the switch does not allow the access code plus a directory number as a legitimate dialed number. A pause is required to wait for the second dial tone if needed. The MICC will not make the call if the end user's line is busy and the MICC interrupts its call if an end user goes off-hook when the telemetry call is connected. An application dialog is required between the MICC and the COSU to initiate the call, initiate data transfer with the utility, and terminate the data transfer.

A Utility Telemetry Trunk (UTT) for connecting a switch to a COSU is two way originating (inbound and outbound). The UTT operates with the same protocol as in the outbound only case but now the switch is able to initiate the protocol to the COSU. Only one (multifrequency) ST pulse is used.

The MICC accesses the utility by transmitting the directory number assigned to the trunks in the UTT group. Calls to other than UTTs are terminated. Successful calls are routed to the UTT groups associated with the destination COSU.

During the call setup, the following features are activated or canceled:

| Feature | Action |
| --- | --- |
| Cancel Call Waiting | Activate |
| Dial Call Waiting | Cancel |
| Automatic Recall (last outgoing) | Cancel |
| Reverse Billing | Activate |
| Audible Message Waiting (Stutter Dial Tone) | Deactivate |
| Screen List Blocking | Deactivate |
| NPA Code Restrictions | Deactivate |

At the termination of the call, these features are reinstated. The Cancel Call Waiting feature is a feature for customers who normally have Call Waiting to cancel that feature for the following call. The Dial Call Waiting feature is a feature whereby customers can activate call waiting by dialing a prescribed number: canceling this feature means that Call Waiting will not be active during the telemetering call. Automatic Recall is a feature whereby if the customer dials a predetermined code then a call to the most recently dialed number will be established as soon as the party at that number is available. Clearly, an end user would not wish to have the telemetry call reinitiated when the COSU became available. Reverse Billing is activated in order to charge the utility for the call. Audible Message Waiting signal (usually a stuttered dial tone) is deactivated, so that the equipment in the MICC receives normal dial tone, and then reactivated because the end user did not yet receive an audible or visual (e.g., message waiting lamp) message waiting signal. Screen List Blocking and NPA (Numbering Plan Area) Code Restrictions are deactivated to allow the telemetry call to proceed even if the destination would normally be blocked by the customer from making ordinary calls. Other features may be added to this list, if such features would interfere with an inbound telemetry call.

There are four disconnect scenarios:

COSU, Utility, or Service Provider Initiated Disconnect

In this case, the COSU signals on-hook to the UTT. This action will cause the switch to transmit a disconnect (800 ms. open) to the MICC. The MICC presents an on-hook to the switch and become inactive. The switch signals on-hook to the COSU. The COSU informs the utility of the terminated call.

Switch Initiated Disconnect

In this case, the switch initiates a disconnect (800 ms. open) to the MICC. The MICC signals on-hook to the switch and become inactive. The switch indicates on-hook to the COSU. The COSU indicates on-hook to the switch. The COSU informs the utility of the terminated call.

End User Initiated Disconnect

In this case, the end user initiates a telemetry call disconnect by going off-hook. The MICC detects the end user off-hook and informs the COSU via a changed signal level. As a result, the COSU indicates on-hook to the switch. The switch signals on-hook to the COSU. The COSU informs the utility of the terminated call. Alternatively, a data signal can be used by the MICC to inform the COSU of an end user off-hook.

MICC Initiated Disconnect

In this case, the MICC initiates the disconnect by going on-hook. The switch indicates on-hook to the COSU. The COSU indicates on-hook to the switch. The COSU informs the Utility of the terminated call.

At the termination of the telemetry call, an AMA record is generated. AMA structure code 00500, Call type 005 is used. Standard AMA definitions are used except that originating NPA & Number and terminating NPA & Number are exchanged. This exchange allows for reverse billing to the utility. Answer is defined as the time at which the COSU goes off-hook. Disconnect is defined as the time at which the COSU or MICC goes on-hook. Alternatively, a special AMA record can be used for such telemetry calls; such a special record may or may not need the end user number and uses a special record indication to identify a telemetry record.

Calls to the utility can further be directed by switch based Multiline Hunt Groups or Automatic Call Distribution Service (ACD). A Multiline Hunt Group distributes inbound utility calls according to one of several types of hunting lists and hunting arrangements. The switch based ACD provides intelligent distribution of incoming utility calls and provides management information to the utilities to provide for efficient management of call center resources. For example, the ACD can level the load of the incoming telemetry calls over the utility telephone lines, provide alternate routing of the inbound telemetry calls, and provide call and call center operations data.

The physical connections between the COSU and the utility are the same as in Outbound service. The communications protocol allows for two way initiation, data transfer, and disconnect scenarios.

FIG. 1 is a block diagram of the operation of applicant's invention. A terminal such as a personal computer (PC) 10 at the office of a utility is connected by a line or connected over an interoffice trunk to a telephone switch 21. Alternatively, it may be connected via a packet network Integrated Services Digital Network (ISDN) connection. When an access number and a directory number are dialed and received from control unit 30, a connection is set up in switch 21 to a central office service unit (COSU) 20. The COSU is located herein in a first central office that includes switching system (switch) 21. This COSU 20 is connected to a plurality of central office switches, such as switch 21 and 22 by utility telemetry trunks (UTT) which are simple interoffice analog or digital trunks today. Each of the switches 21 and 22, which may be housed in different wire centers, has a switching network, 23 and 24, respectively, for transmitting communications signals, such as voice signals, and including the meter reading and device control signals of this invention. Each of the switches comprises control processor means 26, operative under the control of a program 28, stored in memory 27 for controlling the operations of the switch.

When the connection between Control Unit (CU) 30 and COSU 20 and service bureau 60 has been established, CU 30 receives from the COSU or from PC 10 through the service unit a signal to transmit data to trigger the MICC into the telemetry mode. Telemetry and control signals are then exchanged between CU 30 and COSU 20 or utility controller 10 and the data received from CU 30 is transmitted from COSU 20 to PC 10 for processing by the utility. Similarly, utility control signals are sent from PC 10 to COSU 20 for transmission to CU 30 to control devices at the customer's home. If a customer picks up the handset of a telephone station while the communication between the service unit and the meters and/or devices, other than alarm devices, at the customer's location is in progress, these communications are quickly terminated and regular service restored to the customer. An incoming call, however, will receive a busy signal if a telemetry call is in progress.

The specific embodiment of FIG. 1 uses an analog line, transmitting voice band signals, ringing or tone alerting signals, and using direct current detection of supervision. The term "ringing" as used herein is used for convenience and because of its common use, but is meant to describe any process of customer alerting, including, for example customer tone alerting. For Integrated Services Digital Network (ISDN) lines, supervision and customer alerting signals are transmitted as data signals over the D-channel of the customer line.

The UTT is a conventional interoffice trunk such as an analog or digital E & M type trunk or a common channel signaling trunk. Such trunks have arrangements whereby a change of supervision at one end is signaled to the other end by a tone (E & M) or by an out of band tone or data signal. Such a trunk passes a supervisory signal, detected at a line circuit and passed by the switch processor to one end of the trunk, to the COSU to effect a disconnect of that unit when a customer goes off-hook in the middle of a utility access call. When an end user goes off-hook during an inbound telemetry call, other than an alarm call, the MICC or COSU detects the off-hook and signals on-hook to the switch to terminate the telemetry call so that the end-user may originate a call.

The COSU is expanded from prior art COSUs to be connected by trunks to a plurality of switches, such as switch 21, ..., 22, and is connectable by a plurality of trunks (a trunk group) to each such switch. The COSU is also connected to a plurality of utilities and enhanced service providers such as alarm/security maintenance, only one of which is shown, which simultaneously establish calls to different customers.

FIG. 1 shows details of a control unit. A protection circuit 40 is used to protect the rest of the control unit 30 against damage caused by electrical signals carrying excessively high energy. Effectively, this is over-voltage protection. Such protection circuits are well known in the prior art. For calls incoming to control unit 30 from switch 21, alert circuit 42 is used to detect the initial alerting tones used for signaling a request for a connection to the meter interface communication circuit (MICC) 46. The alert circuit continuously monitors the line when the line is on-hook in order to detect such signals. When such signals are detected, it activates the meter interface communication circuit which communicates with PC 10 to exchange the reading information from meters and the control information on meters 50 and the control information for controlling devices 48. When a control and/or reading cycle has been completed as determined by the COSU 20, the COSU goes on-hook which triggers switch 21 to send a 800 millisecond minimum open loop signal to the CU to signal a disconnect.

As long as the control unit 30 presents an impedance in excess of approximately 10k ohms to the line, the central office will treat the line as being on-hook. If the customer should pick up his telephone instrument while the outbound communication between the PC and the meter interface unit is going on, switch 21 will detect the off-hook and cause the communication between the PC and the meter interface unit to be aborted by sending a disconnect signal to the MICC and an on-hook signal to the COSU to terminate the connection. For an inbound telemetry call, the switch receives an off-hook signal from the CU to indicate a request for service.

Arrangements for communicating with on-hook devices such as the meter interface unit 30 are well known in the prior art and are defined, for example, in *Bellcore Technical Reference* TR-TSY-000030, Issue 1, June, 1988.

In order to handle remotely initiated (i.e., incoming) telecommunications calls, the CU 30 and the MICC 46 performs additional functions. The MICC 46 controls a switch 52 on customer line 50. To initiate a call, the MICC 46 applies an off hook signal to the customer line 50. The interface unit then places a call to the utility or service bureau. The switch 52 on an end user's line overrides the normal telephone customer connection which might otherwise inhibit or block alarm calls whenever the customer is using the line or wishes to use the telephone 54. The switch 52 which is controlled by MICC 46 disconnects the customer telephone whenever an alarm device sends out a message, such as an alarm message from alarm device 49, so that the message from the alarm device 49 is transmitted without interruption. For inbound telemetry calls other than alarm calls, the end user has priority over the telemetry call, and the telemetry call will be disconnected if the end user goes off-hook; the connection through switch 52 will not be opened in that case. Also connectable to meter circuit 46 is a smart appliance 47 which can be remotely controlled and which can send a report message, for example, a trouble indication message. For such messages, the customer's telephone is not disconnected and, if the customer chooses to make a call while the message is being transmitted, the message is simply retransmitted after the customer disconnects.

FIG. 1 also includes an automatic call distributor (ACD) 24 which is used to distribute calls from a plurality of central office service units to a number of ports in the utility or service bureau 60. Switches 71, ..., 72 are connected to a second central office service unit 70 which is connected to ACD 24. ACD 24 is also connected to an overflow service bureau 61 for processing overflow utility traffic. The call distributor 24 allows for peaks of traffic from ones of the switches 21, ..., 22; 71, ..., 72. Alternatively, outputs of central service units 20, 70, 73 can be connected directly by a private line, or by a dial-up connection to a single port or to a hunt group via switching network 23 to utility or service bureau 60.

Figure 2:
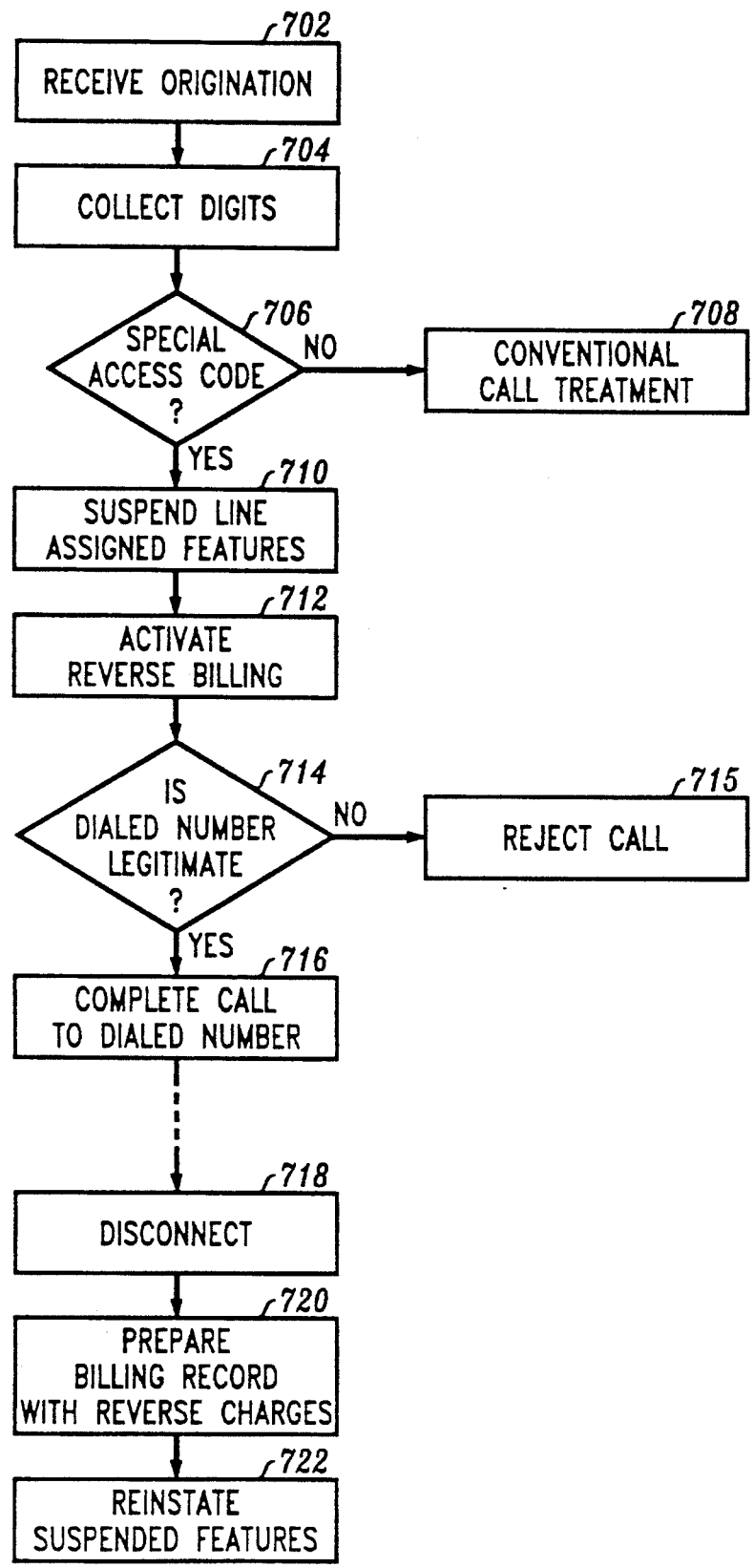
FIGS. 2-3 are flowcharts of actions performed in setting up connections from such meters and devices.

FIG. 2 illustrates the actions performed in an office in response to a remote telemetry call. Block 702 indicates that the office receives an origination. Block 704 shows the beginning of digit collection. Test 706 is used to determine whether the initial digits are the digits of a special access code such as #67 for identifying this special class of calls. If this is not a special access code then the call is treated conventionally (action block 708). If it is a special access code then the interfering features assigned to the line are suspended for this call (action block 710) and reverse billing is activated (action block 712). Among the features that are canceled for the duration of the telemetry call are call waiting, screening list outgoing call blocking, outgoing call blocking for specific numbering plan areas (NPAs), and user features such as automatic callback (end user automatically calls last incoming number), automatic recall; (end user automatically calls last outgoing number), audible message waiting signal (stuttered dial tone), and denied origination service. In general, any feature which might interfere with the establishment of the telemetry call and the tone signaling required to transmit data over the telemetry call connection is canceled for the duration of the telemetry call. Automatic recall is one feature that is not activated after the call is completed because the last number is now that of the utility or service bureau, although it would be possible to program the switch to reinstate the feature using the automatic recall number stored in the switch prior to the telemetry call. After the full digits for the called number have been collected, the switch 21 checks for the legitimacy of the dialed number (test 714). Test 714 is necessary to prevent customers from simply making all their calls collect calls by having them dial a special access code. If test 714 finds that the dialed number is that of one of the service bureaus which offer the telemetry service, then the call is completed to the dialed number (action block 716). If not, the call is rejected (action block 717). After the call is completed, the meter interface communications circuit 46 can perform a handshake operation with the service bureau, including a password, so that unauthorized callers cannot access a service bureau. Subsequently, when the call has been completed and either end disconnects (action block 718), a billing record is prepared for the call, the billing record including reverse charges, and the suspended features for that line are reinstated (action block 722).

Figure 3:
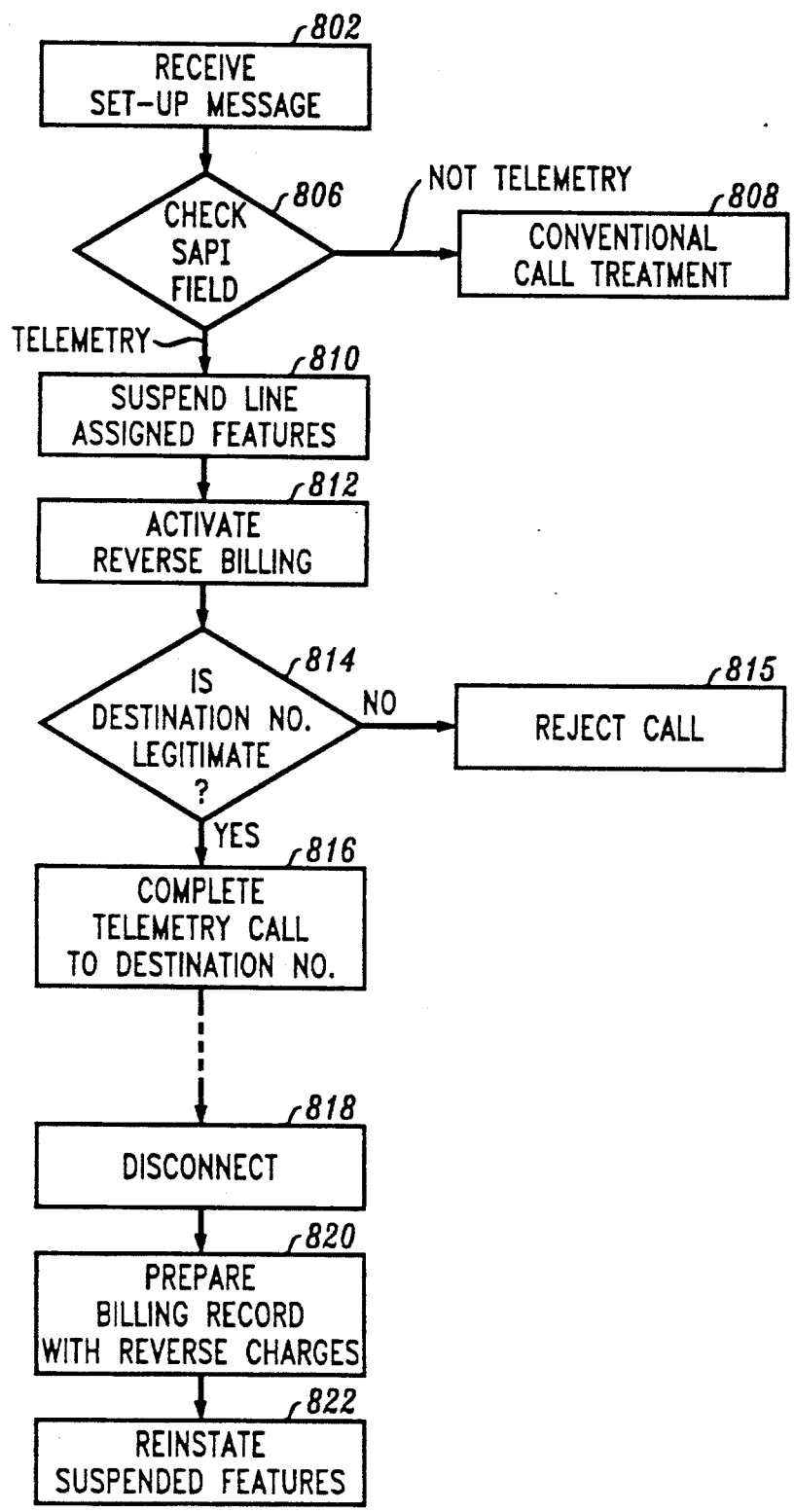

FIG. 3 shows corresponding actions for an ISDN line. An ISDN switch receives a set up message from an ISDN line as the initial action (block 802). The set up message includes the called directory number. The switch checks the Service Access Point Identifier (SAPI) field (test 806) of the set-up message to determine whether or not this is a telemetry call. If it is not a telemetry call, the call is given conventional ISDN call treatment (action block 808). If it is a telemetry call, then the line features are suspended (action block 810) and the rest of the call is handled in essentially the same way as previously described for telemetry calls from analog lines.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. In a communication switching system for serving a line and for serving a plurality of other lines, a method of establishing a special service call to a destination, comprising:
   in said switching system, responsive to receipt of a special service call from said line, the special service call comprising an identifying indicator, deactivating a class of customer features for said line, said class of features identified by said identifying indicator and comprising features that might interfere with said special service call; and
   in said switching system, responsive to receipt of said special service call extending said special service call toward said destination;
   whereby features that might interfere with said special service call are automatically deactivated when said special service call is extended in said switching system toward said destination.

2. The method of claim 1 further comprising:
   reactivating ones of said class for said line after said special service call has been terminated.

3. The method of claim 2 wherein one of said reactivated features is call waiting.

4. The method of claim 2 wherein one of said reactivated features is audible message waiting indication.

5. The method of claim 2 wherein one of said reactivated features is screen list blocking.

6. The method of claim 2 wherein one of said reactivated features is NPA code restrictions.

7. The method of claim 1 wherein said identifying indicator is an access code for distinguishing special service calls from other calls.

8. The method of claim 7 wherein said access code is prefixed by a non-numeric symbol, whereby said access code is readily distinguished from first digits of a dialed directory number.

9. The method of claim 1 wherein said identifying indicator is a special indicator in a header of an Integrated Services Digital Network (ISDN) message.

10. The method of claim 9 wherein said special indicator is in a Service Access Point Identifier (SAPI) field of said header.

11. The method of claim 1 further comprising:
    making a billing entry for said special service call such that said special service call is billed to a customer controlling said destination.

12. The method of claim 1 wherein one of said class of customer features is call waiting.

13. The method of claim 1 wherein one of said class of customer features is automatic recall of the last outgoing call.

14. The method of claim 1 wherein one of said class of customer features is screen list blocking.

15. The method of claim 1 wherein one of said class of customer features is numbering plan area (NPA) code restrictions.

16. The method of claim 1 wherein one of said class of customer features is denied regular outgoing service.

17. The method of claim 1 wherein one of said class of customer features is audible message waiting indication.

18. The method of claim 1 wherein said extending comprises extending via automatic call distribution means.

19. The method of claim 1 wherein said extending comprises extending via multi-line hunting group means.

20. The method of claim 1 further comprising:
    prior to extending said special service call toward said destination, testing whether a called number of said destination is one of a list of telemetry call numbers.

21. A switching system for establishing a special service call toward a destination comprising:
    means, responsive to receipt of a special service call in said switching system, said special service call comprising an identifying indicator, for deactivating a class of customer features of a line originating said special service call the class of features comprising incoming and outgoing call features that might interfere with said special service call; and
    means, responsive to said special service call, for extending said special service call toward said destination.

22. The switching system of claim 21 further comprising:
    a central office service unit connected via a trunk for receiving call set-up signals from a customer premises telemetering control unit.

23. In the switching system of claim 22, the central office service unit further comprising:
    means for connecting to a public switched telephone network for accessing said destination.

24. The switching system of claim 22, wherein said destination has a plurality of servers, further comprising:
    automatic call distributor means for connecting outputs of one or more central office service units to individual servers of said destination.

25. In a communication switching system having means for defining incoming and outgoing call features for a line connected to said system, a method of modifying features assigned to said line, comprising:
    in said switching system, individually activating and deactivating ones of said features for said line in response to feature control signals received from said line;
    in said switching system, maintaining other features independently of feature control signals received from said line;
    the method characterized in that:
    the switching system in response to receipt of call establishment request signals representative of an inbound telemetry call from said line, temporarily, with respect to and for the duration of the inbound telemetry call, suspends operation of all features for said line which have the potential to interfere with an inbound telemetry call.

26. The method of claim 25:
    characterized in that
    features that have the potential to interfere with an inbound telemetry call comprise, but are not limited to: call waiting, automatic recall of last outgoing call, audible message waiting, screen list blocking, numbering plan area (NPA) code restrictions, and no current originating service.

27. The method of claim 25:

characterized in that
the switching system in response to call establishment request signals representative of an inbound telemetry call from said line, temporarily, for the duration of a call, enables features which support an inbound telemetry call.

28. The method of claim 27:
characterized in that
reverse billing is a feature which supports an inbound telemetry call.

29. The method of claim 27:
characterized in that
the method further comprises verification of the plausibility of the call establishment request signals of an inbound telemetry call.

* * * * *